Jan. 19, 1960
W. DEICHMANN ET AL
2,921,786
CLOTH SPREADING MACHINES
Filed March 9, 1953
11 Sheets-Sheet 1
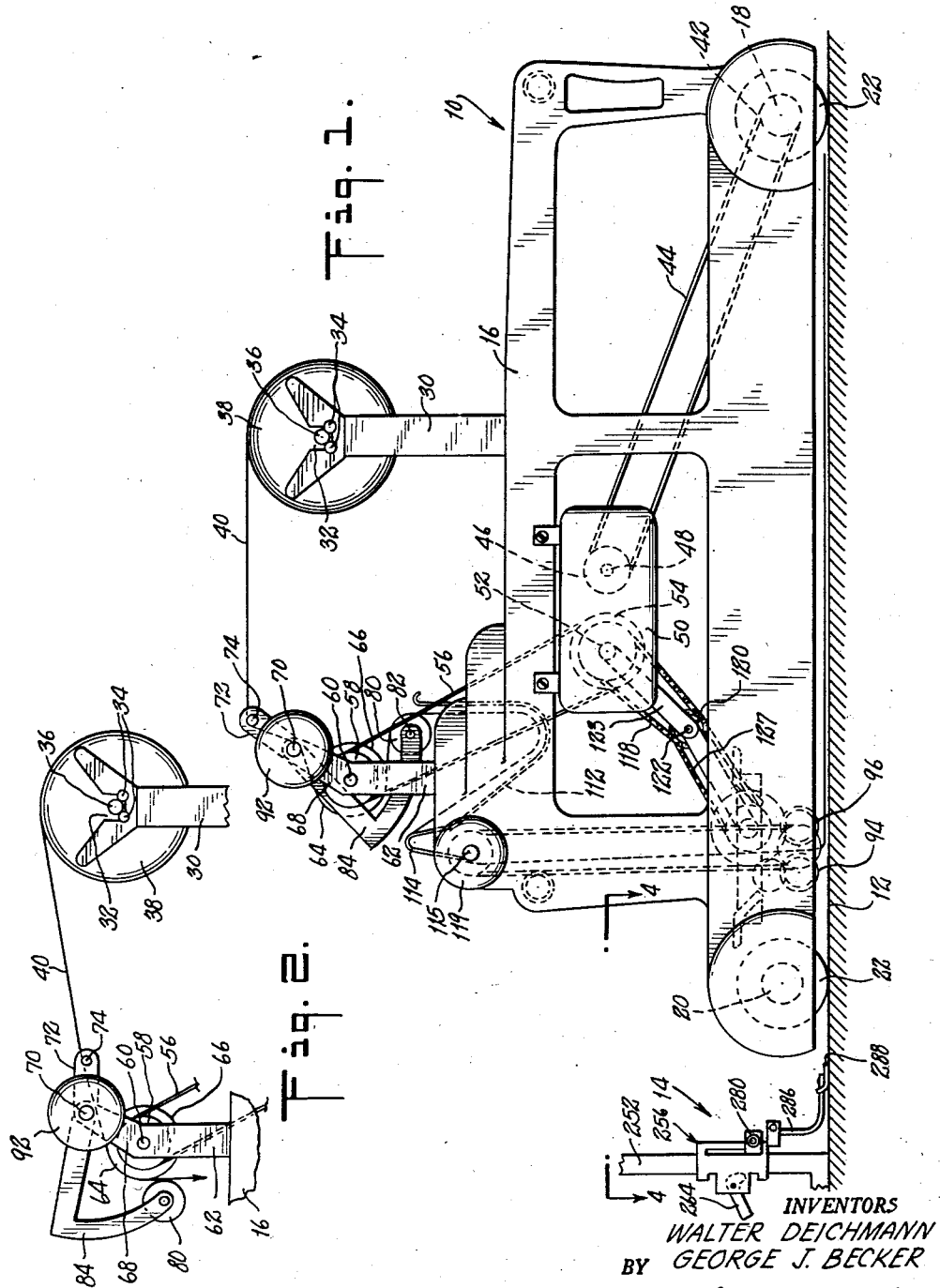
INVENTORS
WALTER DEICHMANN
BY GEORGE J. BECKER
Henry L. Burkitt
ATTORNEY Jan. 19, 1960 W. DEICHMANN ET AL 2,921,786
CLOTH SPREADING MACHINES
Filed March 9, 1953 11 Sheets-Sheet 2
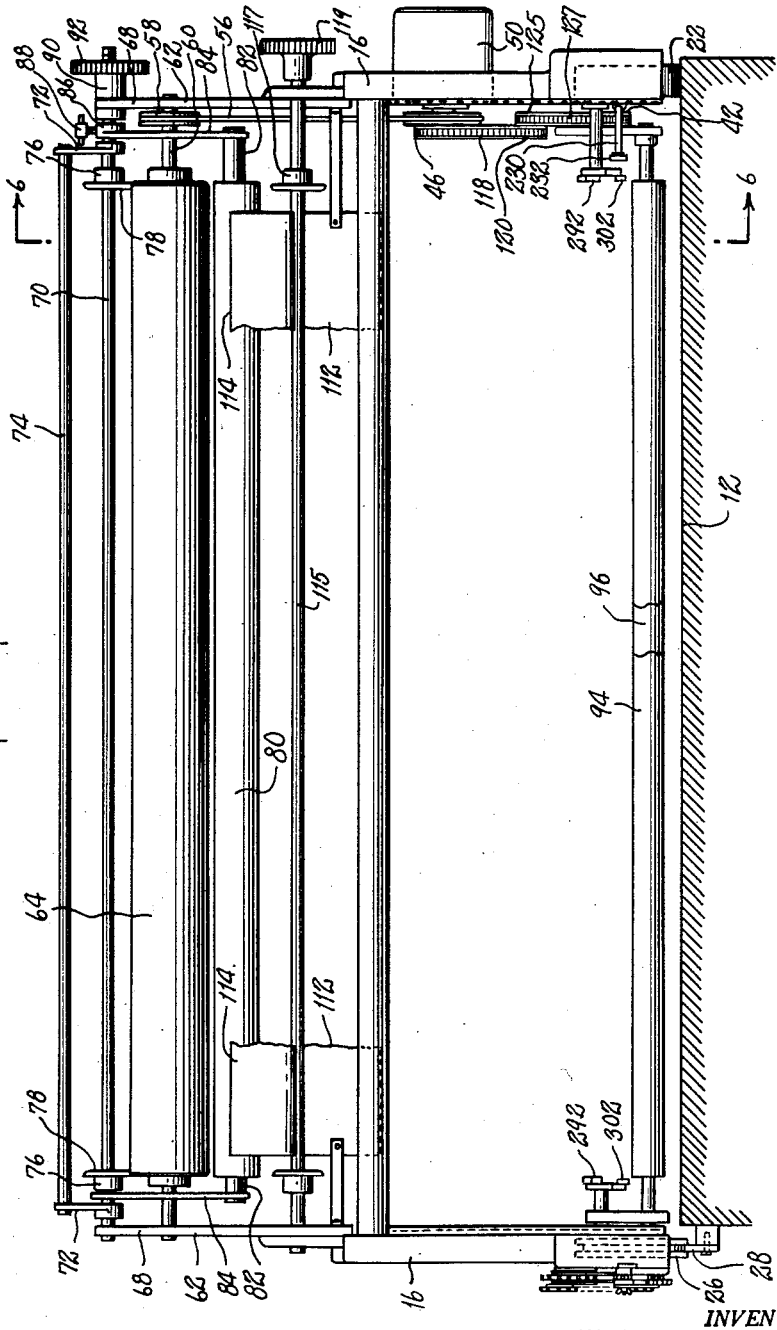
INVENTORS
WALTER DEICHMANN
BY GEORGE J. BECKER
Henry L. Burkitt
ATTORNEY

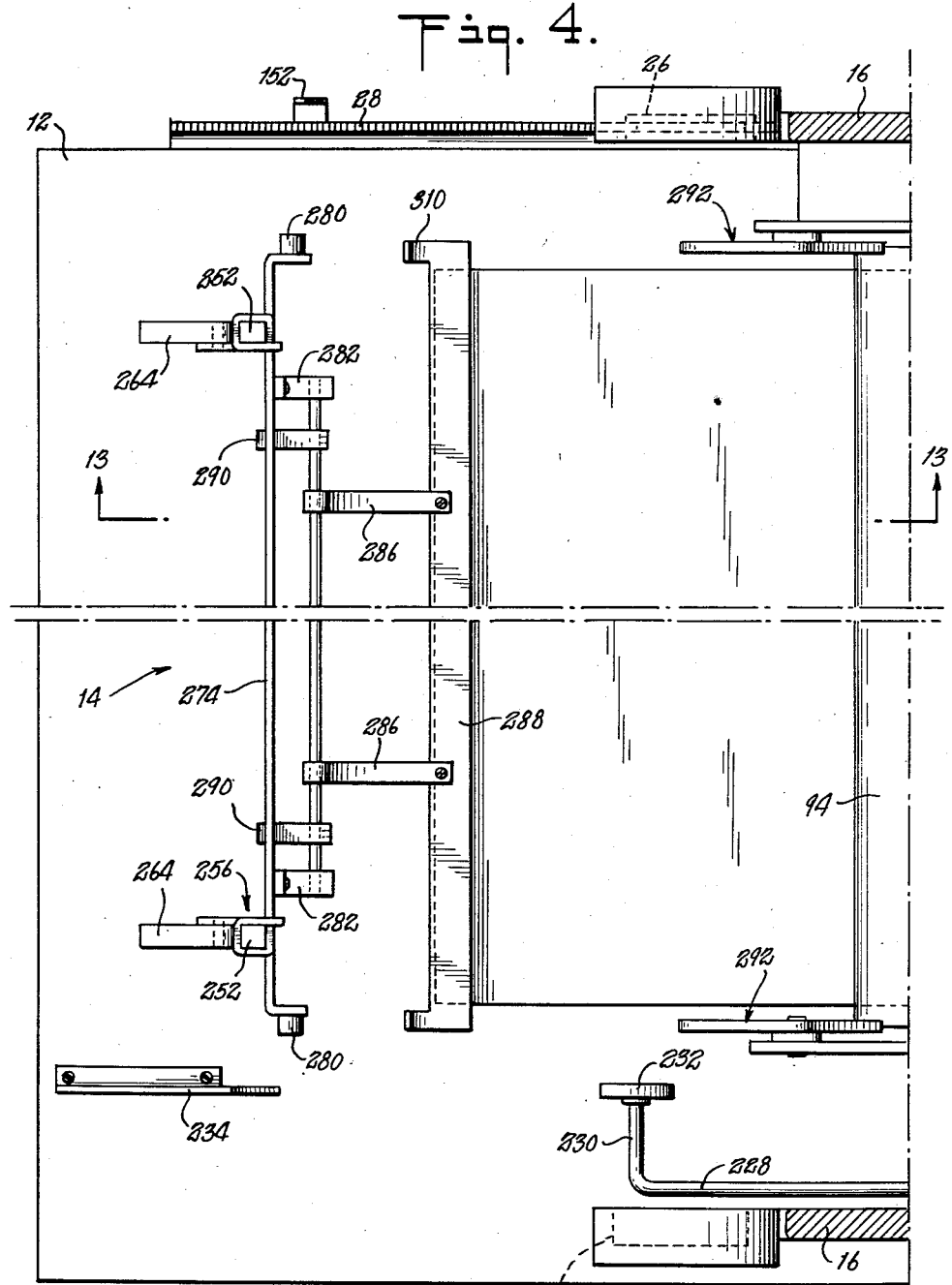

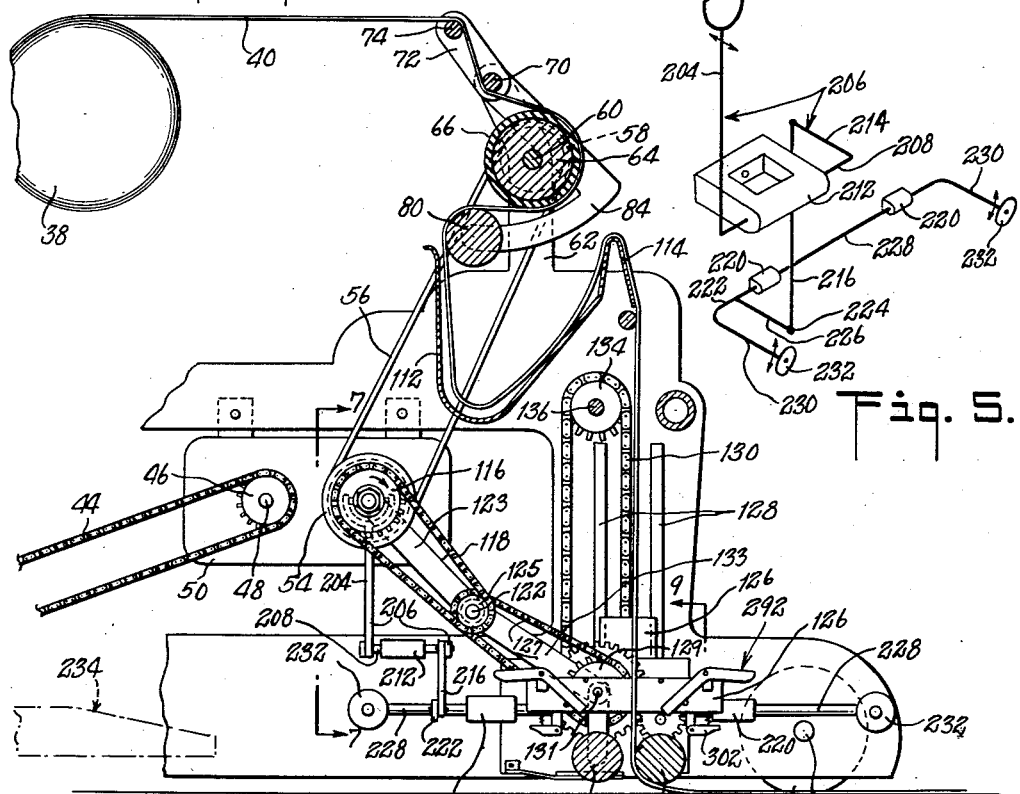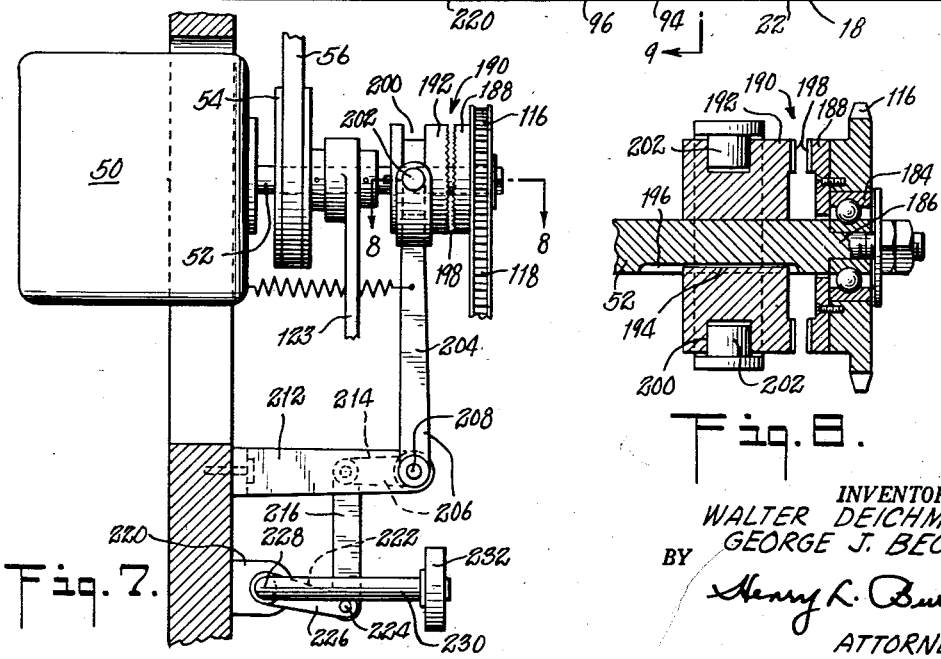

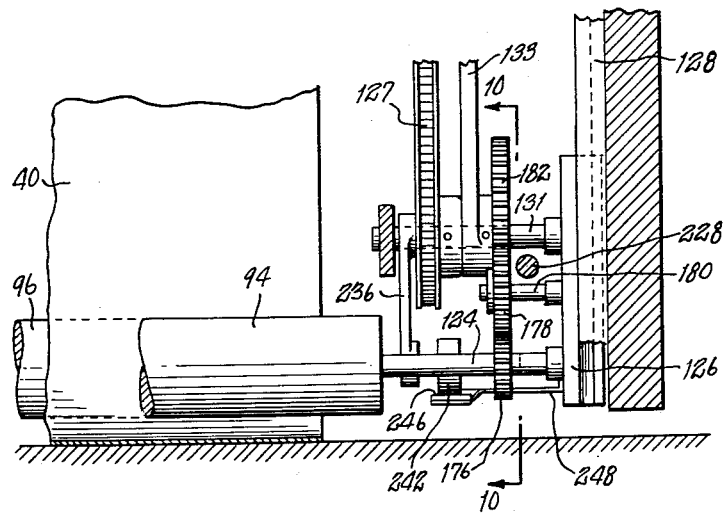
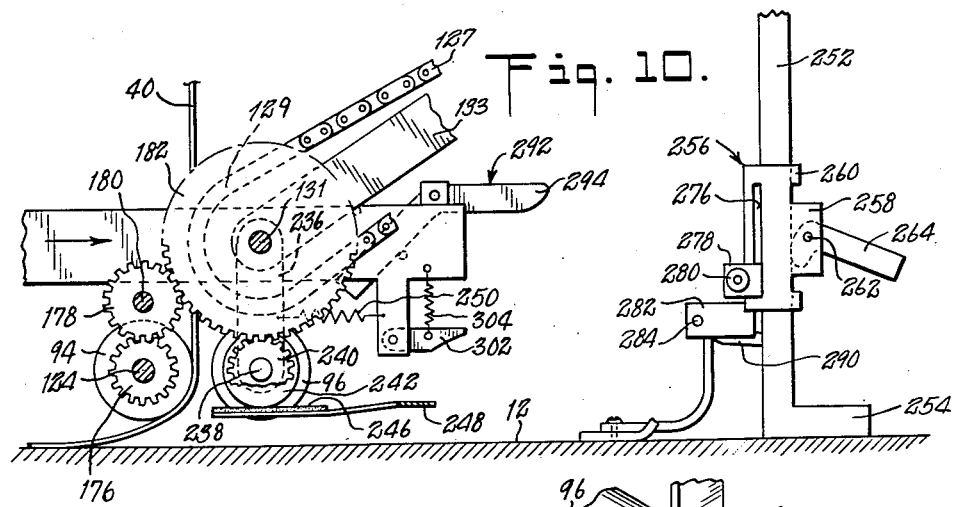
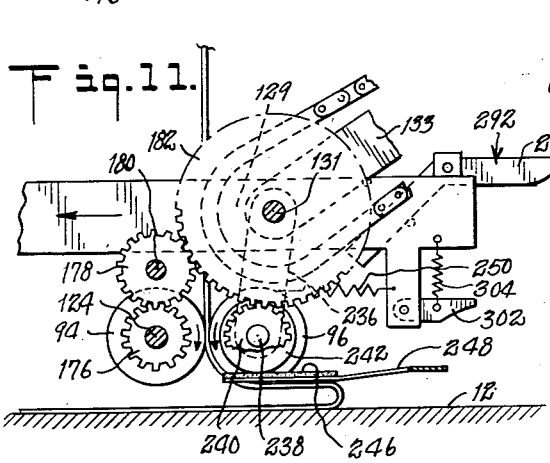
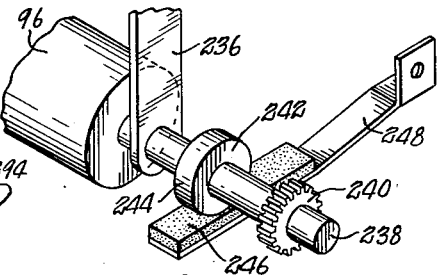
INVENTORS
WALTER DEICHMANN
BY GEORGE J. BECKER
ATTORNEY

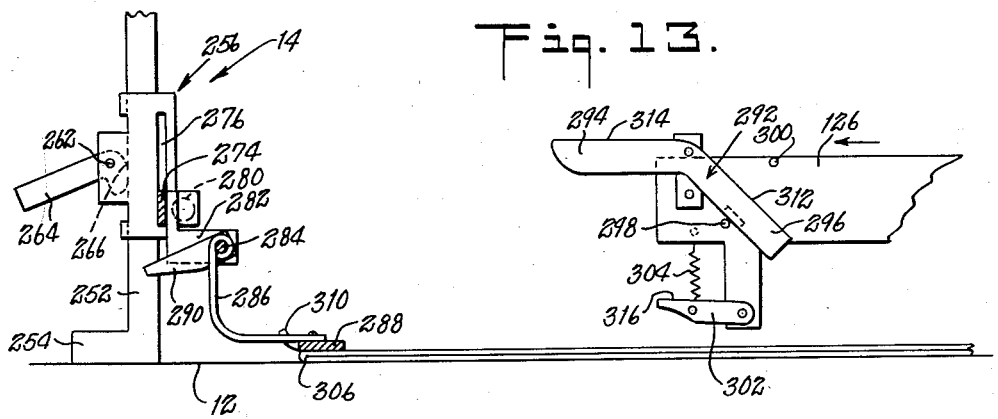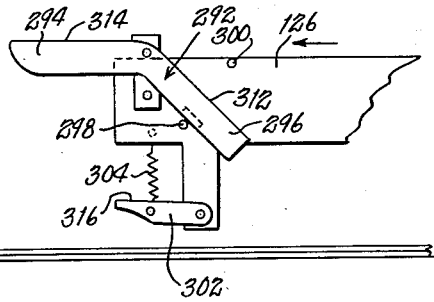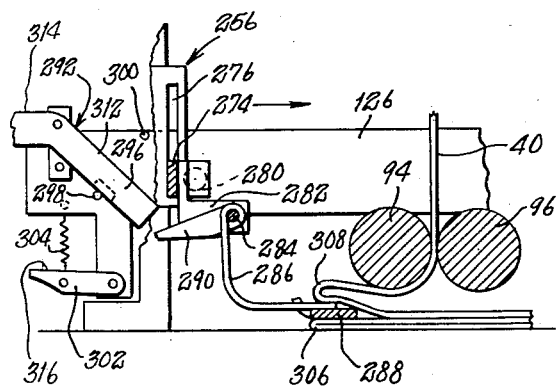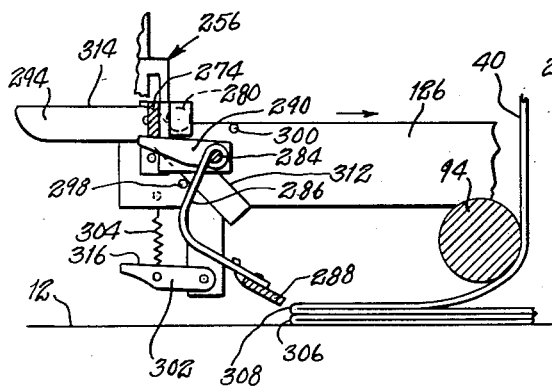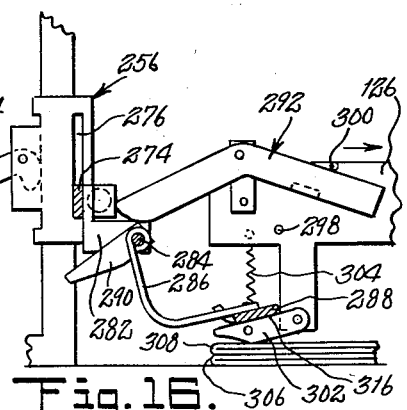

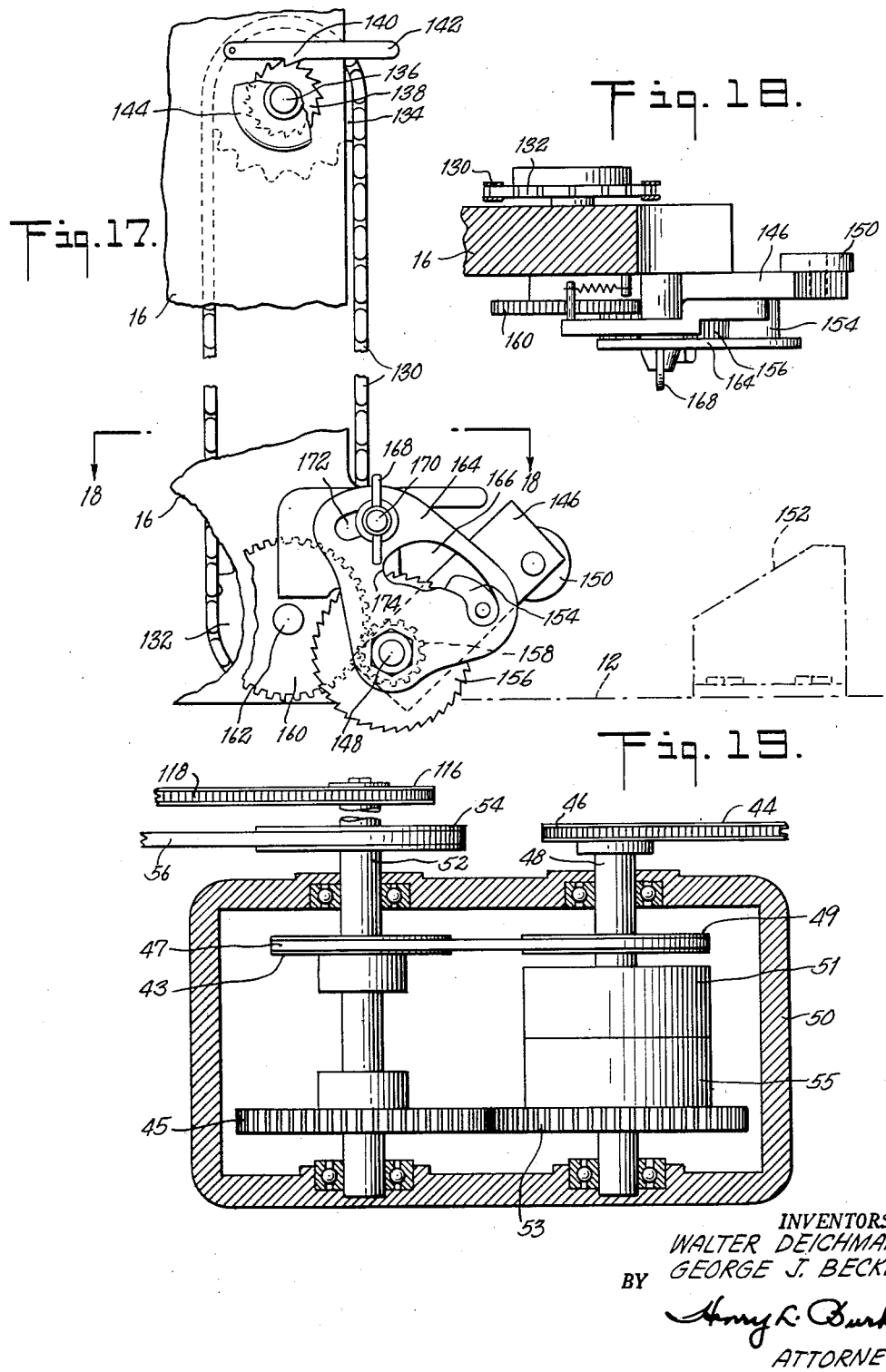

Jan. 19, 1960 W. DEICHMANN ET AL 2,921,786
CLOTH SPREADING MACHINES
Filed March 9, 1953 11 Sheets-Sheet 8
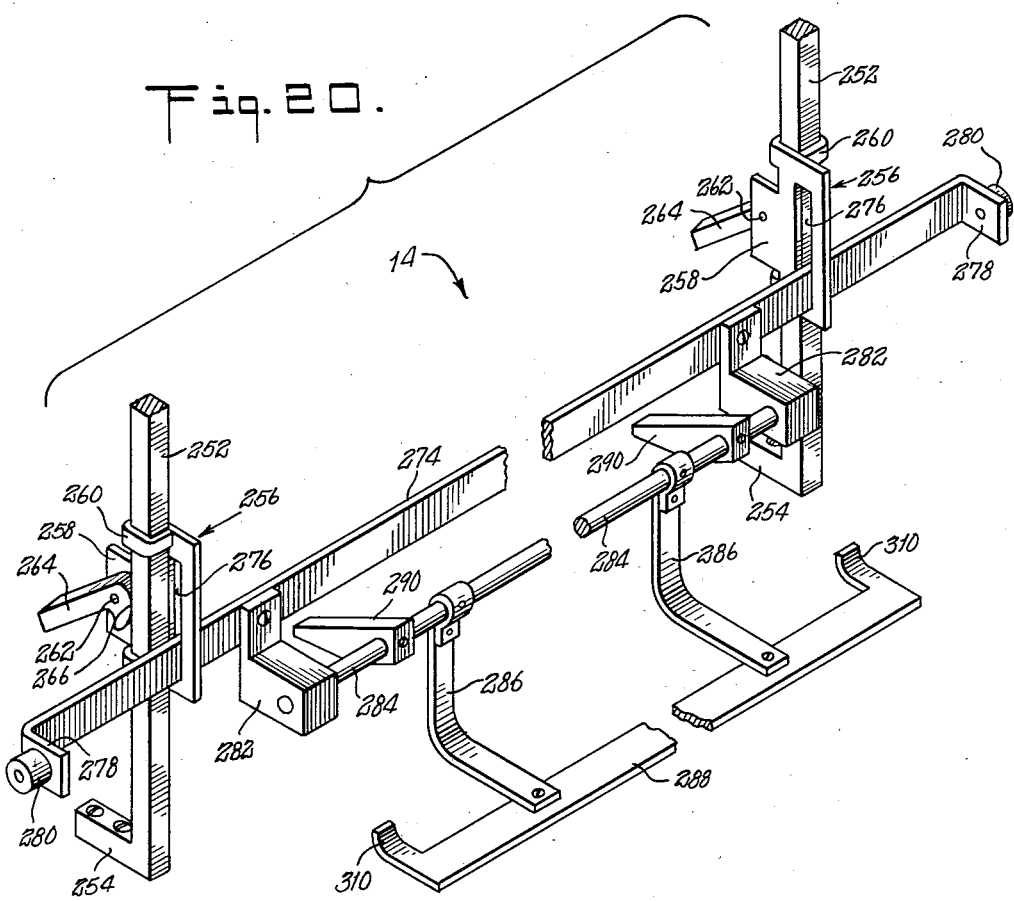
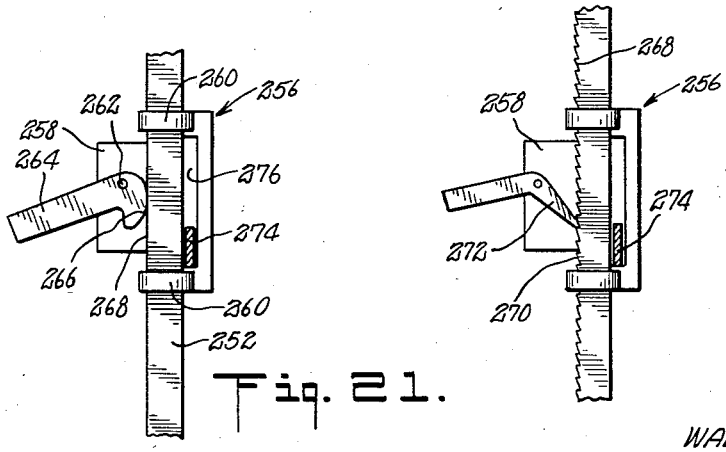
INVENTORS
WALTER DEICHMANN
BY GEORGE J. BECKER
*Henry L. Burkitt*
ATTORNEY

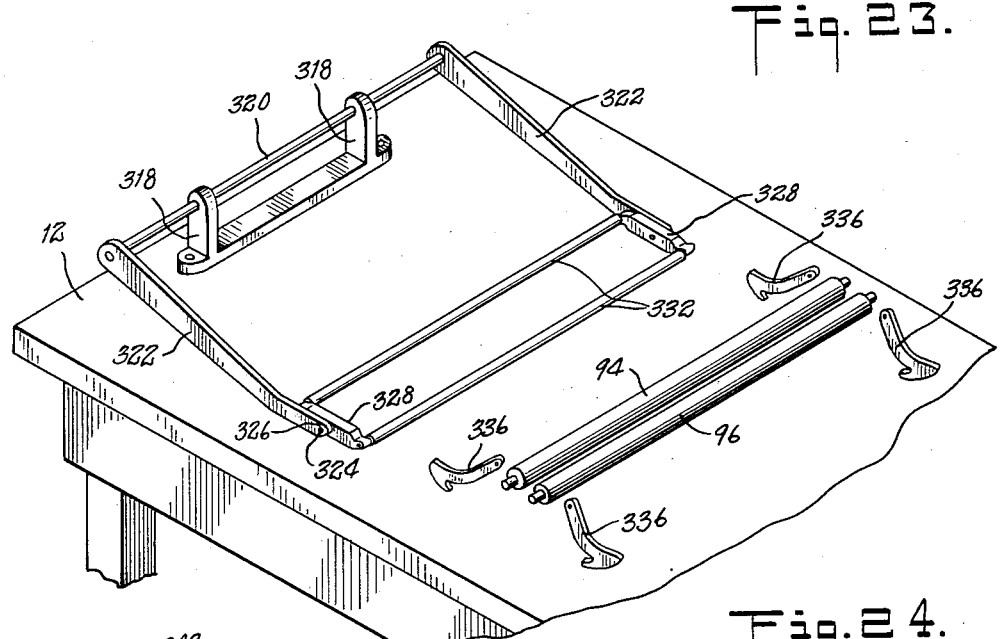
Fig. 23.
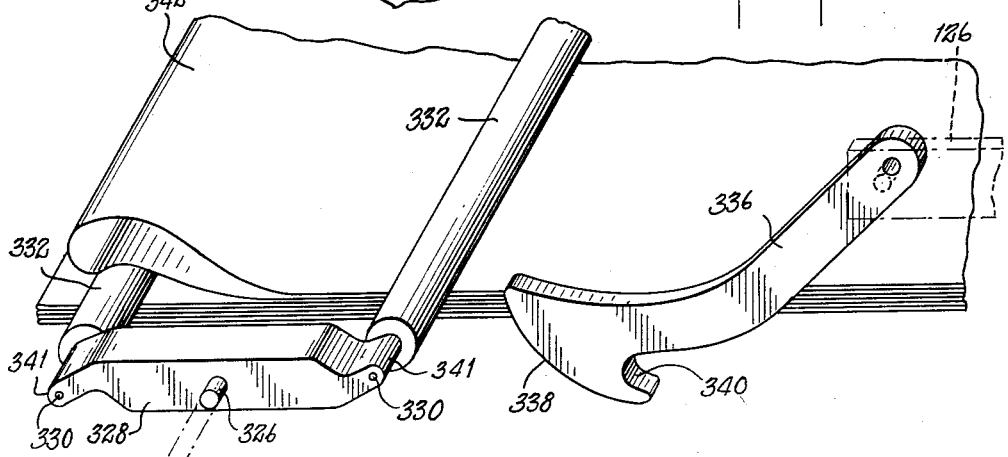
Fig. 24.
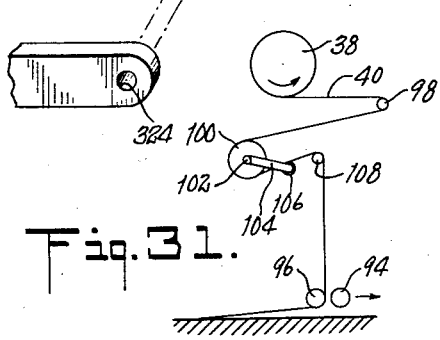
Fig. 31.
Fig. 32.
INVENTORS
WALTER DEICHMANN
GEORGE J. BECKER
BY Henry L. Burkitt
ATTORNEY Jan. 19, 1960 W. DEICHMANN ET AL 2,921,786
CLOTH SPREADING MACHINES
Filed March 9, 1953 11 Sheets-Sheet 11

INVENTORS
WALTER DEICHMANN
BY GEORGE J. BECKER
ATTORNEY

2,921,786
CLOTH SPREADING MACHINES

Walter Deichmann, Mineola, and George J. Becker, Queens Village, N.Y., assignors to Cutting Room Appliances Corp., New York, N.Y., a corporation of New York Application March 9, 1953, Serial No. 341,182

21 Claims. (Cl. 270—31)

This invention relates to cloth spreading machines.

It is an object of the invention to provide a machine for the purpose of spreading fabrics or like sheet materials upon a surface to produce multiple superimposed layers in a position for further processing, as, for instance, for the cutting of multiple pieces of the same fabric for making garments or the like, in which machine the fabric is drawn positively from a supply and then fed positively down against the table at least for a portion of the travel of the machine over the surface when a fold is being formed.

It is an object of the invention to provide apparatus of the type described, wherein fabric is drawn positively from a roll or other source so that the fabric may travel at a substantially uniform rate to means which form a fold in the fed fabric as it is deposited upon the surface.

It is an object of the invention to provide, in apparatus of the type indicated, means wherein fabric is drawn positively from a source of supply as the carriage of the apparatus moves over the surface upon which the fabric is being laid down in layers, but wherein any interruption or slackening of laying fabric down upon the surface will not cause building up of an accumulation of fabric in advance of the means which finally deposits the fabric on the surface, and thus will prevent interference with proper operation of the apparatus since positive feeding of the fabric slows up or ceases in accordance with such slackening or interruption.

It is a further object of the invention to provide, in apparatus of the type indicated, means positively to feed fabric from a supply of fabric on the carriage of a cloth-spreading machine of the type indicated, at a rate of feed governed by the speed of the carriage over the surface at that exact moment, and wherein the fabric is forced to move constantly in the same direction regardless of the direction of movement of the carriage over the table.

It is an object of the invention to provide apparatus of the type indicated wherein positive means for feeding the fabric down upon the table is associated with means to positively draw fabric from a source of supply on the carriage moving over the table, and where the two means are coordinated automatically in accordance with the movement of the carriage over the table.

It is an object of the invention to provide means for spreading fabric in layers upon a table, where two positively driven means are provided, and both are simultaneously energized from the same source in accordance with the movement of the carriage over the table, in which case one functions uniformly to feed fabric from a source of supply for delivery to the other, and wherein the other is positioned so as to spread the fabric smoothly and uniformly upon the table at a uniform rate governed by the speed of movement of the carriage over the table, and to form end-folds in the fabric at the position where the carriage reverses its direction of movement, and whereby distortion of the spread layers is prevented.

It is an object of the invention to provide apparatus of the type indicated, wherein the spreading of fabric upon the table continues uniformly as a concomitant result of movement of the carriage over the table, but wherein, automatically as the carriage approaches the end of its travel over the table, positive spreading means comes into play to assure feeding of fabric without relation to the complete formation of an end-fold for the layer as movement of the carriage upon the table is reversed.

It is an object of the invention to provide, in association with cloth-spreading means of the type indicated, automatic means for clamping the end-folds of the fabric formed at the end of the movement of the carriage in each direction, so that, as the carriage is retracted after it reaches a limit of its travel over the table, forming an end-fold at that position, there will be no dragging of the fabric by the carriage, and thus no tendency to distort the loop of the end-fold out of the form produced by the positive spreading means on the carriage.

It is an object of the invention to provide automatic means to cooperate with the carriage moving over the table, which, immediately as the carriage moves away from the end-fold forming position, will engage upon such end-fold and retain it against distortion, against being pulled out of the end-fold form, as the carriage now moves to spread a new layer on top of layers already formed.

It is an object of the invention to provide apparatus of the type indicated, wherein the cooperation between the carriage and the end-fold retaining or clamping means is such that the end-fold clamping means "wipes" or otherwise smoothens the end-fold before the clamping means finally comes to rest in clamping position.

It is an object of the invention to provide apparatus of the type indicated wherein the fabric for forming the end loop or fold is smoothly and uniformly fed during the last stages of the carriage movement in one direction, during the period that movement of the carriage is being reversed, and then at least during the initial period of movement of the carriage on its new trip for spreading a new layer, wherein all of the previous layers are held against distortion from their previously spread form, and automatically the end-fold clamping means is positioned not only to engage the folds previously formed, but also the fold just formed at that time.

It is a further object of the invention to provide clamping means to hold end-folds in position, wherein all end-folds previously formed are at all times positively retained, and wherein newly formed folds are clamped immediately at the end of formation of such fold, and without release of folds already formed from means clamping them against distortion.

Other objects, features and advantages of the invention will be set forth hereinafter, or will be apparent from the description and the drawings, in which are illustrated embodiments of constructions for carrying out the invention.

The invention, however, is not intended to be restricted to any particular constructions, or any particular arrangements of parts, or any particular applications of any such constructions or arrangements of parts, or any specific methods of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions:

Fig. 1 is an elevational view of a cloth-spreading machine embodying certain features of the invention, the machine being shown as it lays down the first layer of fabric upon a surface, at which time the end-fold clamping means has not yet been activated for the purpose of clamping any fabric end-fold, parts of the end-fold clamping means being broken away for facility in illustration;

Fig. 2 is a detail elevational view of a portion of the apparatus shown in Fig. 1, illustrating the positive fabric feeding means in an adjustment different from that shown in Fig. 1;

Fig. 3 is an end elevational view of the apparatus shown in Fig. 1, as seen from the left-hand end of the apparatus shown in Fig. 1, the fabric being shown in position as being fed, part of the fabric being broken away in order to illustrate certain other portions of the apparatus;

Fig. 4 is a partial plan view, to enlarged scale, of the apparatus, seen from the line 4—4 of Fig. 1, to illustrate the construction and operation of certain of the parts of the end-fold clamping means, and their relationship to the parts on the carriage;

Fig. 5 is a diagrammatic view in perspective of a portion of the apparatus for actuating certain of the controls of the means for positively spreading fabric upon the surface;

Fig. 6 is a detail cross-sectional view of the apparatus, substantially on the line 6—6 of Fig. 3, some of the parts being shown in elevation for further clarity in illustration;

Fig. 7 is a detail cross-sectional view, substantially on the line 7—7 of Fig. 6, and to slightly larger scale, to illustrate the relationship of the parts of the power-delivering means and the controls for the fabric-feeding means, some of the parts being shown in elevation for clarity;

Fig. 8 is a detail cross-sectional view, to slightly larger scale, on the line 8—8 of Fig. 7, some of the parts being shown in elevation for clarity;

Fig. 9 is a detail cross-sectional view, substantially on the line 9—9 of Fig. 6, to enlarged scale, to illustrate further the drive for the fabric-feeding means and the controls therefor, parts of rolls and fabric being broken away, and certain of the parts being shown in elevation for clarity;

Fig. 10 is a detail cross-sectional view, substantially on the line 10—10 of Fig. 9, illustrating parts of the fabric-feeding means and the controls therefor, and the relation thereof to the end-fold clamping means, particularly as the parts are moved together and before the fabric-spreading means has been activated;

Fig. 11 is a view similar to Fig. 10, the end-fold clamping means being omitted, the operation of the fabric-feeding means being illustrated at the stage before complete separation between the carriage and the end-fold forming position takes place;

Fig. 12 is a perspective view, illustrating the operation of a portion of the fabric-feeding means to effect positive interengagement of the parts of that means for fabric-feeding when the carriage is in the vicinity of the end-fold forming position, and as the end-fold clamping means is activated;

Fig. 13 is an elevational view to illustrate the cooperation of parts of the carriage and of the end-fold clamping means, as the carriage is moving toward that means, just before the carriage has moved to a position to complete the formation of a fold;

Figure 25:
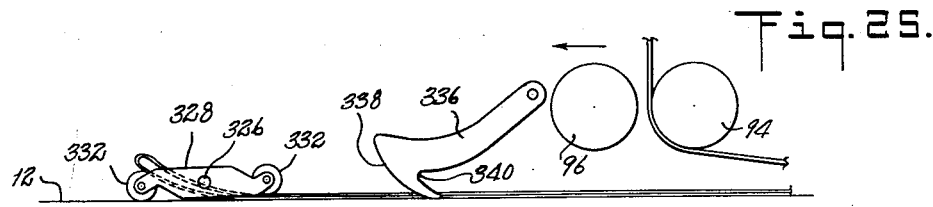
Figure 26:
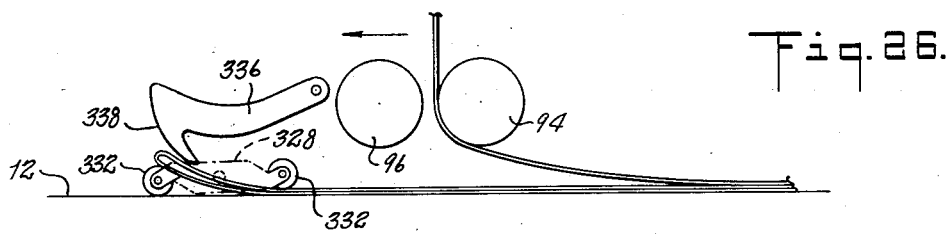
Figure 27:
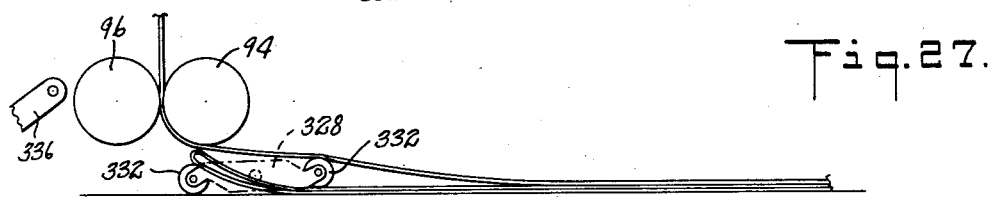
Figure 28:
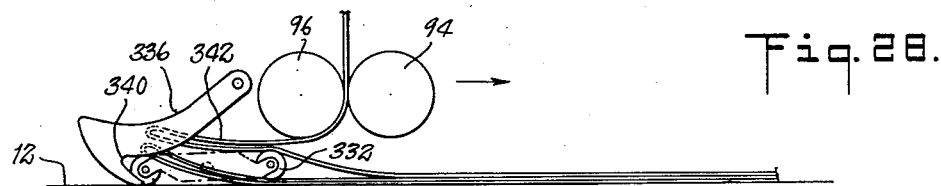
Figure 29:
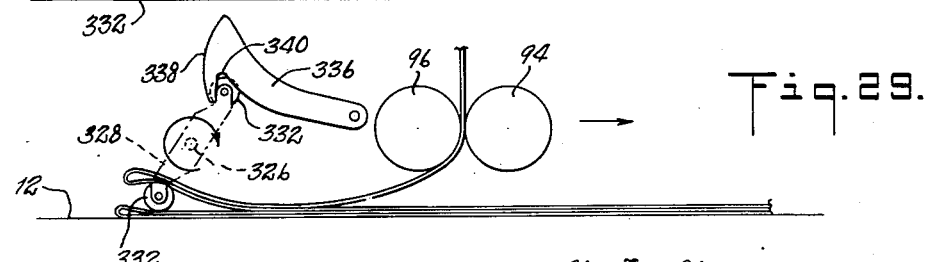
Figure 30:
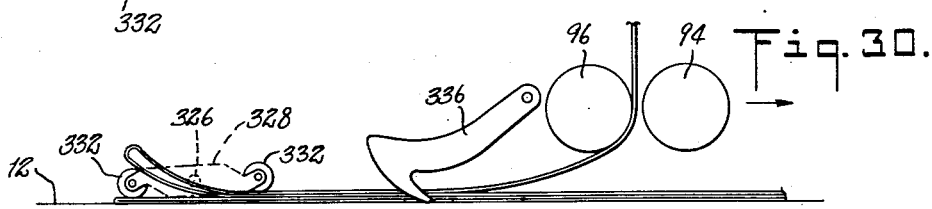
Figure 33:
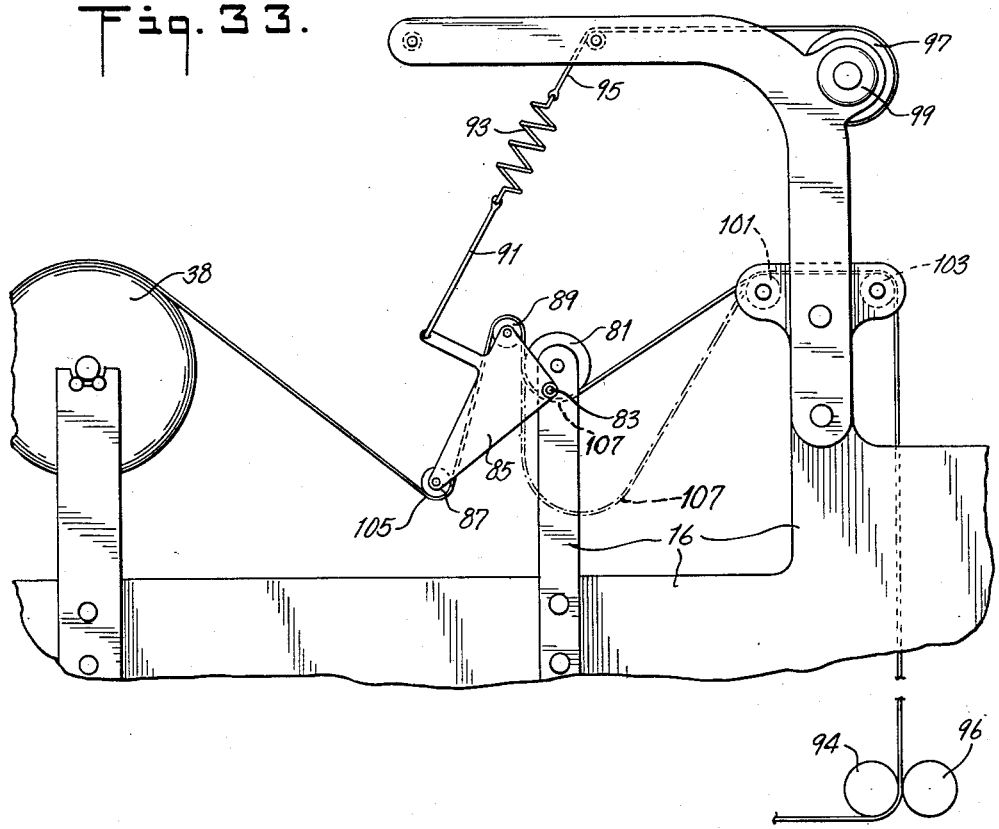
Figure 34:
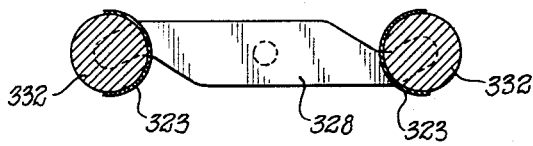

Fig. 14 is a view similar to Fig. 13, illustrating the relationship of the carriage and its end-fold forming means, after a fold has been formed and the carriage has been reversed and is being moved away from the end-fold forming position, and just before engagement of a portion of the carriage with the end-fold clamping means which engagement will cause actuation of the clamping means to engage and clamp the fold just formed, parts being broken away to permit illustration of other parts in associated relationship;

Fig. 15 is a view similar to Fig. 14, but illustrating the position of the parts after the engagement has taken place to effect actuation of the end-fold clamping means by the carriage to lift the clamping means free of the fold just formed, and to position the clamping means so that it will be disposed properly to clamp all of the folds already formed, including the one just formed;

Fig. 16 is a view similar to Fig. 15, to illustrate the final stage of the positioning of the end-fold clamping means in clamping position upon the folds as the carriage finally recedes from the end-fold forming and clamping position;

Fig. 17 is a detail elevational view, parts being broken away, to illustrate apparatus automatically to lift the end-fold forming means, including the fabric-spreading means, as the superimposed layers of fabric build up on each other and on the surface;

Fig. 18 is a detail cross-sectional view, substantially on the line 18—18 of Fig. 17, illustrating details of an adjustment for the lifting means, so that variation may be in accordance with the operation of the fabric-spreading means;

Fig. 19 is a cross-sectional view of the mechanism for effecting, from the backward-and-forward motion of the carriage over the table, rotation of a spindle continuously in the same direction, in order to be able to drive the fabric-feeding means in the same direction constantly no matter which way the carriage is moving, back and forth over the table;

Fig. 20 is a perspective view, to enlarged scale, of a portion of the end-fold clamping means, parts being broken away;

Fig. 21 is a detail elevational view of a holding means for the end-fold clamping means of Fig. 20;

Fig. 22 is a view similar to Fig. 21, but of a modified form of the holding means;

Fig. 23 is a perspective diagrammatic view of a modified form of end-fold clamping means, only the feeding rolls and associated fingers, which would be mounted on the carriage, being shown to illustrate that portion of the apparatus;

Fig. 24 is a perspective view to enlarged scale of certain of the parts shown in Fig. 23, the parts being shown in the relation they assume as the carriage approaches the end-fold clamping means to form and deposit a new end-fold for retention by the clamping means;

Fig. 25 is a diagrammatic elevational view of certain of the parts of the carriage and the end-fold clamping means illustrated in Figs. 23 and 24, showing their relationship as the carriage approaches the clamping means and spreads a new fabric layer;

Fig. 26 is a view similar to Fig. 25, but with the parts moved into position of interaction of fingers carried by the carriage with the clamping means;

Fig. 27 is a view similar to Figs. 25 and 26, showing the cooperation of the parts at the end of travel of the carriage;

Fig. 28 is a view similar to Figs. 25, 26 and 27, showing the action of the finger and the clamping means on reversal of movement of the carriage;

Fig. 29 is a view similar to Fig. 28, showing a continuation of the action commenced in Fig. 28;

Fig. 30 is a view similar to Figs. 25 and 29, showing the final stage after the clamping means has completed its action under the impetus of the fingers on the carriage;

Fig. 31 is a diagrammatic view of a modified form of fabric feeding means;

Fig. 32 is a view similar to Fig. 31, illustrating the relationship of the parts in their cooperation when, for some reason, feeding of fabric to the surface by means of the positively driven spreading means lags the feed of the fabric by the feeding means;

Fig. 33 is a diagrammatic elevational view of a modified form of fabric feeding means; and Fig. 34 is an elevational view, partly in section, illustrating a modified form of the structure shown in Fig. 24.

On the drawings, apparatus embodying features of the invention is shown to comprise a carriage 10 disposed to be moved over the surface of a table top 12, the illustration showing the carriage disposed with relation to end-fold clamping means 14 (Fig. 1). The carriage may have a pair of side frames 16 of any suitable design, the frames being held rigidly spaced apart by means of cross braces in a manner well known in the industry. Frames 16 may retain bearings for stub shafts 18 and 20 upon which wheels 22 are mounted. At other positions on the frames, bearings are provided for trunnions formed or otherwise provided on wheels 26. A track 28 may be assembled at one side of table top 12. Wheels 26 are mounted upon track 28, which may have teeth to form a rack. The track guides the carriage, and also positively rotates wheels 26 as the carriage moves back and forth on the table top. Wheels 22 roll upon the surface of the table top which is made wide enough for this purpose. Track 28 may be at the very edge of the table top.

The frames may have a pair of uprights 30 at the upper ends of which suitable recesses 32 may be provided. In each recess may be disposed suitable bearing members 34 upon which may be disposed, freely to rotate thereon, the ends of a bar or rod 36. Such rod is intended to support a roll 38 of fabric 40, or other continuous length of material, to be fed from the roll to the apparatus to be described.

Stub shaft 18 for one of the wheels 22 carries a pulley or sprocket 42. A belt or chain 44 extends from pulley 42 to a pulley or sprocket 46 mounted upon a shaft 48 which extends from a gear box 50 carried by one of frames 16 in any suitable manner. Within gear box 50 is an arrangement of overrunning clutches similar to that shown in Letters Patent No. 2,263,555 of H. Walter Gilbert, Walter Deichmann and Frank Dexter, issued November 25, 1941, by means of which intermittently reversing rotational movement of pulley 46, as the carriage moves back and forth upon the table top, is translated into continuous rotation of a shaft 52 in a single direction, regardless of whether wheel 22 is moving in one direction or the other along the table. The structure of the gear box 50, shown in Fig. 19, is intended to show such a clutching arrangement, but is not described in detail. It should be understood that a pulley 43 is fixed to shaft 52, within the box, as is also a gear 45. A belt 47 from pulley 43 drives a pulley 49 fixed to rotate with the drum 51 of one overrunning clutch. Drum 51 and its pulley 49 rotate freely on shaft 48, but are capable of driving engagement according to the direction of rotation of shaft 48. Likewise gear 45 has driving engagement with a gear 53 affixed to a drum 55 of the other overrunning clutch, the drum 55 and its gear 53 being loosely rotatable upon shaft 48 but capable of driving engagement when the shaft rotates in the direction reversely of that for drum 51. It is thus obvious that one or the other of the overrunning clutches will be engaged while the other is coasting, but, owing to the direct drive of the belt 47 and the reverse drive of gears 45 and 53, shaft 52 will be rotated in the same direction at all times.

Shaft 52 carries a pulley 54 from which a belt 56, therewith engaged, drives a pulley 58 carried by a shaft 60.

Uprights 62, fixed to frames 16, provide bearings for shaft 60 upon which is mounted a roll 64. Surface 66 of roll 64 may have a surface from which positive traction against materials being fed thereby will be attained. Such surface may be defined by a facing material such as rubber or the like, of such composition and construction as to increase the frictional engagement of the surface with fabric 40 of other sheet material which may be disposed to be fed from roll 38. Thus, roll 64, positively driven in one direction at all times, serves to draw fabric from roll 38 as the carriage is moved back and forth over the table.

In order to retain the fabric in engagement with surface 66, and provide means to adjust this engagement, devices such as shown in Figs. 1, 2 and 6 may be provided. Each upright 62 may include a terminal section 68 extending angularly from the main body of the upright; between sections 68 may be extended a rod 70. On rod 70 may be disposed a pair of arms 72 between the ends of which extend another rod 74. By means of suitable securing means, the position of rod 74 may be adjusted in relation to the sheet of fabric being guided from roll 38. On rod 70, suitable collars 76 with guide faces 78 may be disposed to guide the material to roll 64 from roll 38. Fabric from roll 38 is trained over rod 74, then under rod 70, and finally around roll 64.

From roll 64, the fabric passes to a roller 80 the bearings for the stub shafts 82 of which are in the ends of a pair of arms 84 adjustably carried on rod 70. For this purpose, one or both of arms 84 may have clevis collars 86, with a screw clamp manipulated by a handle 88, for making the parts available for ready adjustment of arms 84 to vary the angle at which fabric 40 is caused to leave roll 64, and thus to vary the amount of the surface of roll 64 in positive engagement with the fabric. An adjustment for lateral movement of rod 70 is provided by means of a collar 90 having an enlarged hand wheel section 92, the collar being threaded onto the end of rod 70 and bearing against the frame for determining the lateral position of the rod and its collars 76 with relation to the fabric. This adjustment may be effected at any time during the operation of the apparatus.

Since arms 84 are mounted to pivot around rod 70 as an axis, as arms 84 are moved on that axis, the position of tangency of the fabric on roll 64 changes. Thus, adjustment of arms 84 with relation to roll 64 will increase or decrease the amount of fabric frictionally engaged by the roll. As shown in Fig. 2, it is possible to release roller 80 completely from engagement with the fabric, in which case minimum contact between roll 64 and the fabric will result; positioning of the fabric with relation to roll 64 will then be effected only by rod 70 which retains substantially a fixed relationship. However, as shown, rod 74 may be positioned to increase even further the amount of surface 66 engaged by the fabric.

Beyond roller 80, fabric 40 hangs downwardly. What occurs here will depend upon the amount of fabric being fed by other rollers 94 and 96 directly to the layers forming upon the table top, the operation of which will be further described.

In Figs. 31 and 32, there is illustrated modified means for drawing fabric from roll 38, and for feeding it to rollers 94 and 96. Fabric moves from supply roll 38 over a rod 98 carried upon the frame in any desired manner to serve as a fixed guide. From rod 98 the fabric passes around roll 100 which is positioned and may be driven substantially in the same manner as roll 64. Mounted to pivot with relation to roll 100, as, for instance, on shaft 102 upon which roll 100 is mounted, are arms 104. Means are provided, in any well-known manner, whereby arms 104 may be disposed at any desired angle with relation to fabric 40 as that fabric leaves roll 100, after it has partially encircled the roll, and now is disposed with relation to a roller 106 carried at the end of arms 104. Roller 106 thus serves normally to determine the degree of contact between fabric 40 and roll 100 for effecting frictional engagement for proper feeding action. A guide rod 108 may be disposed on the carriage to receive the fabric beyond roller 106, and to provide the downturn point for movement of fabric to rollers 94 and 96.

As shown in Figs. 31 and 32, when rollers 94 and 96 are pulling fabric, or taking fabric being fed, over guide rod 108 in proper manner, the fabric from guide rod 108 to roll 100 will be substantially taut; in fact, this can be adjusted, if desired, so that practically no contact between the fabric and roller 106 ensues normally. At such time, however, as shown in Fig. 32, when, for some reason, fabric is not being fed by or over rollers 94 and 96 in sufficient quantities, as, for instance, as a result of reverse movement of the carriage, or where overfeeding by roll 100 takes place, or for some other reason (illustrated diagrammatically by the loop back from roll 96), the slack forms a downwardly hanging fold 110. The result is that contact between fabric and the surface of roll 100, as shown in Fig. 32, will decrease, and slippage will result.

Thus, roll 100 will be made ineffective properly to feed fabric from roll 38 until the slack formed by loop or fold 110 has been taken up in any suitable manner, as, for instance, by further movement of the carriage over the table to spread the fabric in forming a new layer. Thus, automatically, the driving power of roll 100 is reduced, or even made ineffective, when sufficient take-up of the fabric does not occur at rollers 94 and 96.

In Fig. 33, there is illustrated a further modified form wherein the means are particularly adapted for feeding material where some resistance may arise as the fabric is being withdrawn from the main supply roll 38. In the structure shown, a roll 81 is positively driven in the same manner as roll 64. A pair of pivots 83 are provided on frames 16 to mount a pair of triangular arms 85. Pivots 83 are preferably not on the same center as roll 81 for convenience in transmitting driving power to that roll. As shown, the pivots are below the shaft of roll 81. Carried between the ends of arms 85 are a pair of rollers 87 and 89. Anchored to arms 85 is the end of a cable 91, which is secured to the end of a coiled spring 93. From the other end of the spring, a cable 95 is led over a drum 97 to which it is secured. Suitable means, such as a hand-wheel 99 and a suitable holding means such as a ratchet and pawl, hold the drum at a position for a desired tension of spring 93. In Fig. 33, the arms are at their lowermost position, determined by a stop (not shown).

Also carried between frames 16 are a pair of rollers 101 and 103 which are idlers. As can now be seen, the sheet material is drawn from roll 38, down under roller 87, then up and over roller 89, down and around the bottom face of roll 81, then up and over roller 101, and across, around and then down from roller 103 to the cloth-spreading device. Such device is here illustrated by rollers 94 and 96. However, this apparatus is particularly applicable to the well-known "box" guide, where roll 81 assures a constant supply of material at a predetermined minimum tension. It should be clear now that spring 93, adjusted from drum 97, counterbalances the weight of arms 85 and rollers 87 and 89, permitting sufficient weight to be applied to the loop 105 from roll 38. If resistance is encountered in drawing the sheet material off roll 38, the assembly on arms 85 will be lifted until the total weight of arms and associated rollers acts on the material being drawn from roll 38.

On the other hand, roll 81 is provided with a traction face, as was roll 64. Preferably, it is driven to overfeed rollers 94 and 96. If a loop 107 forms because of this overfeeding, it is clear that the driving contact between sheet material and roll 81 is lost until the sheet material is drawn from the loop again to make proper contact with the traction face of roll 81.

In Fig. 6, the fabric from roller 80 may hang down into a trough 112 provided to guard fabric, depending from roller 80, against contact with the moving parts of the apparatus. Thus, if a sufficient accumulation of fabric should result if, for some reason, the feeds of rollers 94 and 96 and roll 64 do not coordinate properly, the excess fabric will pile up within trough 112 without becoming smudged or otherwise interfering with the operation of the apparatus. Such provision is required, even though it may be preferred to adjust or "time" roll 64 to feed approximately at the same rate as rollers 94 and 96; in some cases, slight overfeeding by roll 64 may be desired. The fabric runs smoothly over the formed face 114 at the top end of the trough, and then feeds vertically downwardly between rollers 94 and 96 by which the fabric is directed down onto table top 12. In association with trough 112 may be a rod 115 carried by frame 16; collars 117 may be provided to be adjusted on rod 115; the rod may be adjusted longitudinally by a hand wheel 119 similarly associated with frame 16 as is rod 70.

Rollers 94 and 96 may be coupled to be driven continuously whenever the carriage is moved; also they may be arranged constantly to engage the fabric extending from face 114. Such means may comprise a sprocket 116, which, for certain purposes, may be fixed on shaft 52 to drive a chain 118. Chain 118 in turn drives a sprocket 120 mounted upon a spindle 122 carried at the end of an arm 123 loosely mounted to pivot on shaft 52, but being held against lateral movement by means of collars fixed to the shaft. Spindle 122 is associated with other parts, to be described, to rotate rollers 94 and 96 in opposite directions.

Spindle 122 also carries a sprocket 125 over which is trained a chain 127 to drive a further sprocket 129 carried upon a spindle 131, to be described. A rigid link 133 is carried between spindles 122 and 131 so that, as spindle 131 rises and falls, in a manner to be described, drive connection from shaft 52 to spindle 131 will be maintained as links 123 and 133 pivot with relation to each other.

It has been found desirable, for certain purposes of the invention, to activate rollers 94 and 96 only during certain portions of the movement of the carriage over the table, and, in that relation, keep the rollers out of driving engagement with the fabric except when power is delivered to them for effecting the feeding function. At all other times, the rollers are in position to serve as guides, remaining relatively stationary or being free to rotate except for the restraint of friction upon the several parts. The rollers are sufficiently smoothly faced so that the fabric glides smoothly over them and then comes to rest upon the table top or other superimposed layers already laid down.

Roller 94 may have a spindle 124 which is provided bearings in a pair of blocks 126 (Fig. 9) disposed at opposite sides of the carriage in frames 16. Each block may be provided ways 128 in its respective frame so that it may slide vertically. At least one block may have the ends of a chain 130 anchored therein; the chain is then trained around sprockets 132 and 134 carried on spindles provided bearings in frame 16. On spindle 136 for upper sprocket 134 may be fixed a ratchet 138 engaged by a pawl 140 carried upon a pivoted finger 142. Finger 142 may be lifted manually, as desired, so that, by means of the weight of blocks 126 and the parts carried thereby, the blocks will drop to their lowest position. Ordinarily, however, the engagement of pawl 140 with ratchet 138 will sustain the block at whatever position to which it may have been raised, as, for instance, by actuation of a hand wheel 144 provided on spindle 136, whereby rollers 94 and 96 may be raised whenever it is desired.

Automatic lifting of blocks 126 may be effected in relation to the movement of the carriage back and forth on the table; such means may include an arm 146 pivoted on a pin 148 fixed in the frame. The arm is disposed to rock back and forth against the action of a spring (not shown). Arm 146 carries a roller 150 which will engage against a stop 152 on table top 12. Stop 152 may be associated with end clamping means 14, or may be located in any other way so that, when the carriage reaches the end of its movement along the table top in the direction of stop 152, arm 146 will move a pawl 154 pivoted on that arm; the pawl is positioned to fall into engagement with a ratchet 156 mounted to rotate on pin 148. Ratchet 156 is fixed to a gear 158 which thereby is rotated; gear 158, engaged with a gear 160 is fixed to shaft 162 upon which sprocket 132 is fixed, serves to rotate that sprocket. Thus, as arm 146 is actuated, it causes sprocket 132 to drive chain 130 sufficiently to lift block 126 a distance equivalent to the thickness of the layers just laid down in the movement of the carriage back and forth over the table.

An adjustable frame 164 may be pivotally mounted on pin 148 and be disposed so that pawl 154 is housed within opening 166, the frame being held located by means of a thumb nut 168 carried on a threaded pin 170 extending through a slot 172 to clamp the frame in a determined relationship to the pawl. The stroke of arm 146 is thus determined by engagement of the pawl against end wall 174 of the opening, to determine adjustably the amount of movement of ratchet 156, the feed of blocks 126 vertically, and the amount rollers 94 and 96 are lifted with relation to the fabric laid down on the table.

Spindle 124 may have fixed therewith a gear 176 which is driven from a gear 178 carried on a shaft 180 provided bearings in blocks 126. Gear 178 in turn is engaged by a gear 182 fixed to spindle 131 which in turn is provided bearings in block 126, and rises and falls with the block.

However, as here shown, it is preferred that sprocket 116 be not fixed to shaft 52; it may be carried on a ball bearing 184 (Fig. 8) which, in turn, rotates upon a reduced end 186 of shaft 52. Suitable lock nuts and washers retain the bearing and sprocket 116 against separation from the shaft end. Carried by sprocket 116 in any suitable manner is one section 188 of a clutch 190. The other section 192 of the clutch is slidably mounted on shaft 52, but is retained to rotate with the shaft by means of a spline 194 on section 192 slidably disposed in a keyway 196 in shaft 52. When teeth 198 of sections 188 and 192 are moved into engagement, it is obvious that shaft 52 will then drive sprocket 116 and thereby drive rollers 94 and 96.

Section 192 has a groove 200 in which pins 202, carried by an arm 204, are engaged. Arm 204 forms a part of a bell crank 206 the intermediate pin 203 of which is pivotally mounted upon a bracket arm 212 carried by a frame 16. The other arm of the bell crank is arm 214, which has, at its free end, pivotal connection with a link 216. Link 216 is pivotally connected to another bell crank 222 at 224, the arm 226 of which is fixed to a shaft or rod 228 which is provided bearings in a pair of brackets 220 carried by the frame.

As shown in Fig. 5, rod 228 may be a substantially U-shaped member the cross-bar of which is provided with bearings in brackets 220. At the end of each arm 230 of the U a roller 232 may be mounted. Rollers 232 are positioned to engage upon one or the other of a pair of cams 234 (Fig. 4) disposed adjacent the limits of travel of the carriage. When engagement does take place (Figs. 6 and 7), the particular roller 232 is lifted, rotating rod 228 in its bearings to actuate link 216, thus rocking bell crank 206 to move sections 188 and 192 into engagement. Since the carriage is at that time moving over the surface of the table top, shaft 52 is being rotated, and, by the coupling of the clutch, will drive gear 182, and through it, gear 176 and roller 94.

Carried upon opposed spindles 131 so as to be suspended therefrom are a pair of arms 236. These arms are free to swing on their respective spindles 131. At the lower ends of the arms are provided bearings for a spindle 238 carrying the other roller 96. On spindle 238 is fixed a gear 240 which is meshed with gear 182. Also on spindle 238 is a roller 242 which is positioned to rest its face 244 upon a surface 246.

Surface 246 is part of a spring arm 248 secured at one end to block 126. Surface 246 may be prepared specially to provide suitable traction for roller 242. Normally, when the clutch parts are not in engagement, a spring 250 will retain roller 242 and the associated roller 96 in the position shown in Fig. 10, where rollers 94 and 96 are not closed into engagement with the fabric. However, when the clutch parts are driven into engagement as just described, gear 182 drives gear 240, and roller 242 begins to rotate in contact with surface 246. The result (Fig. 11) is that roller face 244 rolls upon surface 246, carrying roller 96 with it, and bringing the rollers into engagement against the fabric fed between them.

Now the rollers positively feed the fabric, laying it down upon the table continuously as the carriage moves to its end position. This feeding will be uniform, and will also continue until rollers 94 and 96 are permitted to disengage from each other. This will not occur until the direction of movement of the carriage has been reversed, and the carriage moved sufficiently to release roller 232 from cam 234. At this time, spring 250 will overcome the inertia of the parts, and retract roller 96. Thereafter the fabric will move past rollers 94 and 96 without being driven thereby.

Thus it is obvious that means are provided continuously to feed the fabric from the supply in a quantity such that it will flow smoothly down to and around rollers 94 and 96, in whichever direction the carriage is moving, and so that the fabric will be laid down smoothly upon the table or upon the previously spread layers. As the carriage approaches the end of its movement in either direction, the fabric will actually be taken under control by engagement of rollers 94 and 96 therewith. This control will then continue throughout the movement down to the limit, through the halt of movement of the carriage, and through the reversing of movement of the carriage, smoothly laying the fabric down in a layer, and forming a fold as the carriage is returned until the fabric can be controlled by suitable end-fold clamping means.

For the purpose of controlling the fabric by suitable end-fold clamping means, there is associated with the table and the carriage, suitable means 14 for engaging the fold immediately after it has been formed, as the fabric is being spread properly upon the table, and before rollers 94 and 96 have released the fabric. As shown in Fig. 20, a pair of uprights 252 may be positioned upon the table, as, for instance, by having the feet 254 secured to the table spaced apart sufficiently not to interfere with the movement of the carriage as it moves into and out of association with the parts carried by the uprights and cooperating with parts on the carriage. Slidably mounted on each upright is a carrier 256. The uprights, for certain purposes, are of non-circular cross-section so that the carriers, slidable thereon, are retained against rotation relatively thereto. Each carrier may consist of a plate 258 having an ear 260 formed or otherwise made integral with each end, the ears being received over the respective uprights 252. Because of the non-circular formation of the ears and uprights, plates 258 will be positioned substantially parallel to each other.

Carried on an extension of plate 258 is a pin 262 upon which is pivotally mounted a finger 264 having a cam face 266 (Fig. 21). Face 266 is so disposed with relation to pin 262 that the distance between pin 262 and face 266 increases in a direction such that since carrier 256 tends to move downwardly, face 266 rolls on side face 268 of upright 252 to tend to rotate finger 264 to clamp and bind carrier 256 in that position. On the other hand, if carrier 256 is lifted, face 266 rolls on side face 268 to release the parts from this clamping engagement, permitting the carrier to rise freely.

In Fig. 22, a modified form is shown in which, in substitution for this camming action, a set of ratchet teeth 270 is formed on face 268, and cooperates with a pawl 272 substituted for finger 264. Thus, as carrier 256 rises, pawl 272 will ratchet over teeth 270, to the position where it will retain the carrier in the position to which it has been raised, and will not resist such upward movement of the carrier.

A bar 274 extends transversely of the table, and is carried in a pair of substantially parallel slots 276 in plates 258. The ends of bar 274 are defined by a pair of angle ends 278 upon each of which is disposed a roller 280. Intermediately of and on bar 274, between uprights 252, are positioned a pair of bracket arms 282 which extend toward the carriage to provide supports for a rod 284 which extends between arms 282. Rod 284 is carried in bearings in arms 282 so that it may rock with the parts carried thereby. Suspended by a pair of substantially right-angular arms 286 rigidly secured to rod 284, is a clamp plate 288. Plate 288 normally (Fig. 15) is advanced in front of rod 284, and normally its flat bottom face would not be parallel to the surface of the table because of its unbalanced relationship. A couple of fingers 290 are fixed to rod 284 and provide at least some degree of counterbalance for plate 288 and its associated parts.

An arm 292 may be pivoted at either end of block 126. Arms 292 (Fig. 13) are of obtuse angle construction, the two parts being of such weight that, as they are swung on a pivot, and in order, for certain purposes, to maintain section 294 normally horizontal, section 296 is heavy enough to require the use of a stop pin 298 fixed on block 126 as a limit. Another stop pin 300 on block 126 is provided to limit upward movement of section 296. Arms 292 are in the planes of rollers 280. On an extension of block 126 is pivoted a finger 302. A spring 304 extends between block 126 and finger 302; by reason of the length of the spring, it normally retains finger 302 in the position shown in Fig. 13.

When the carriage and the end-fold clamping means 14 are approaching each other at the initial stages, the parts assume the positions shown in Fig. 13. Rollers 94 and 96 are spreading the fabric in one direction. The end-fold clamping means, by means of its plate 288, may already have engaged a fold 306 which has been laid down on the table top. When the carriage has reached the limit of its movement, and is returning from the formation of a fold 308, the parts assume the position shown in Fig. 14. In the advance of the carriage past end-fold clamping means 14, it is obvious that section 296 would have rocked over rollers 280 (dotted lines in Fig. 14), as arms 292 pivoted upwardly, stop pin 300 retaining the arms so that they would return to position after passing the rollers. Fingers 302 are in line with end arms 310 formed as a part of plate 288. These end arms (Fig. 13) are beneath the level of fingers 302, and they will not engage as the carriage moves into and slightly past these end arms. The carriage will be brought to a stop by means of suitable end stops 152 after which the carriage may be returned.

Faces 312 of sections 296 are in position to engage rollers 280 again (Fig. 14). Fold 308 has now been deposited by rollers 94 and 96 on top of clamp plate 288, which, as shown, has not moved from the relationship shown in Fig. 13. Rollers 94 and 96 still continue to feed the fabric as the carriage now is returned, whereupon (Fig. 15) faces 312 engage rollers 280, which ride up on faces 312, lifting bar 274. Bar 274 rides in slots 276, carrying rod 284 and clamp plate 288 with it. Clamp plate 288 smoothly moves out of its position on top of fold 306, and swings backwardly. Fingers 290 come to rest against bar 274 to limit inward swinging movement of clamp plate 288, and to retain the clamp plate in position for association with fingers 302 in the later positions.

As the carriage continues its movement away from the endfold clamping means, rollers 280 finally ride up on the top faces 314 of sections 294. By this time, however, fingers 302 have come into line with clamp plate 288. Now (Fig. 16) as rollers 280 tend to leave faces 314 of sections 294, clamp plate 288 comes to rest on faces 316 of fingers 302. Springs 304 are tensioned, supporting clamp plate 288 (Fig. 16) and its associated members as the carriage continues to move away from the end-fold clamping position. Finally plate 288 slides off fingers 302, and comes to rest in the position shown in Fig. 13, clamping the immediately formed fold 308 into association with the other folds.

Apparatus for performing this end-fold clamping operation is located at either end of the table, suitable complementary parts being carried at each end of blocks 126 for association with end-fold clamping mean of substantially identical structure at either end of the table. When the carriage is moved away from cam 234, rollers 94 and 96 will become disengaged by reason of the action of spring 250, whereupon the fabric will then feed normally by being drawn past the rollers. The clutch action may be eliminated, if desired, and the fabric may be continuously fed by rollers 94 and 96, then kept at all times in engagement.

In Figs. 23 to 30 inclusive, a modified end-fold clamping means has been illustrated. As shown in Fig. 23, a pair of uprights 318, carried on the table, as, for instance, on a suitable base, provides a mounting for a rod 320 at the ends of which are fixed a pair of arms 322. The arms, with rod 320, are pivotally mounted to move freely. At their ends, arms 322 provide bearings 324 (Fig. 24) upon which trunnions 326, formed as part of pieces 328, are pivotally mounted. Pieces 328 provide bearings for trunnions 330 at the ends of a pair of rolls 332, the side pieces and the rolls being held together to form a relatively rigid frame. The rolls may be smoothly surfaced; in one modification, portions of the surfaces may be provided with frictional material as shown in Fig. 34. It will be noted that portions 323 of such frictional material do not extend for the entire circumference of the rolls. It is obvious that whenever the rolls are at rest, portions 323 will be in contact with the fabric. However, as rolls 332 are fixed against rotation in pieces 328 for this purpose in the modification shown in Fig. 34, as the frame is rotated in the manner to be described, the free parts of the rolls not having portions 323 applied thereto are the parts which ride smoothly upon the fabric. Trunnions 330 provide for free rotational movement in the bearings in side pieces 328. The rolls are distinctly spaced apart.

The operation of device shown in Figs. 23 and 24 is diagrammatically illustrated in Figs. 25 to 30, inclusive. From blocks 126 may be hung a pair of fingers 336. Each finger is shaped to provide a cam face 338 and a hook recess 340. The finger may be provided with suitable means, such as a spring member, to maintain it raised sufficiently so that, as the carriage advances toward the end-fold clamping means (Fig. 24), faces 338 will engage against the shaped ends 341 of side pieces 328. It will be noted that the whole frame, including rolls 332 and side pieces 328, in the initial operation, rests flat on the table.

Fingers 336, at each side of the table, ride up over shaped ends 341, and then over the side pieces, as the carriage moves to complete the formation of the end-fold. At the end of the carriage movement, the end-fold 342, as shown, has been deposited upon the tops of both rolls 332. Now the carriage commences its return movement (Fig. 28). Fingers 336 arrive at the shaped ends 341 of side pieces 328 furthest away from the carriage. Ends 341 are shaped to fit into recesses 340. Hook recesses 340 engage the ends 341 which, of course, are laterally beyond the fabric deposited on rolls 332. Fingers 336 (Fig. 29) lift the side pieces, together with the immediately adjacent roll 332, and, in so doing, pivot the entire frame about trunnions 326 (Fig. 29). The other roll 332 remains at all times in engagement with the layers already deposited, but moves to the position previously held by the lifted roll. In doing so, it wipes the fabric and smoothens the layers which have already been formed. Finally, the engaged roll (Fig. 30) rises to a position beyond the dead center; gravity takes effect, and the frame falls free of fingers 336. The roll which had been lifted now falls rapidly into position upon all the layers which have thus far been spread, anchoring them in position. In the meantime, the other roll has completed its wiping motion, and has smoothened the layers under the layer just spread. The fingers 336 now resume their initial positions, and the carriage moves to the other limit, where a similar end-fold clamping means goes through the same operation.

When the carriage now returns, fingers 336 will engage the other shaped ends 341 in the same manner as before, lifting the frame and throwing the whole frame over so that the rolls are at all times in engagement with all of the fabric excepting one layer at all times, and at the end of the repositioning action, all of the layers are engaged. In addition to this, the end-fold clamping means serves to smoothen out the layers, and to lay them down flat one upon the other.

Many other changes could be effected in the particular constructions, and in the methods of use and construction, and in specific details thereof, hereinbefore set forth, without substantially departing from the invention intended to be defined herein, the specific description being merely of the embodiments capable of illustrating certain principles of the invention.

What is claimed as new and useful is:

1. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means so that the sheet material arriving at the delivering means is under substantially uniform tension, the drawing-and-feeding means comprising a single roll having a traction-producing surface for engaging sheet material bearing upon the roll, and means for guiding sheet material from the supply means to the roll to maintain the sheet material as it moves from the supply means at all times in a longitudinal relationship to the roll surface for positive engagement therewith but free to slip on the side of the roll removed from the supply means, the guiding means being adjustable to determine the amount of roll surface engaged by the sheet material.

2. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, means for causing the roll to rotate in a single direction in whichever direction the carriage moves back and forth over the surface and to a degree determined by the amount of movement of the carriage in either direction, the surface of the roll having traction-producing means for engaging sheet material bearing upon the roll, means for guiding sheet material from the supply means to maintain the sheet material bearing upon the traction-producing means as the sheet material moves from the supply means to the roll, the guiding means being positioned so that the sheet material as it moves from the supply means is at all times in tangential relationship to the roll surface but is free of the roll on the side removed from the supply means, and means for adjusting the guiding means to maintain a delivery loop of a length of sheet material free of the roll between the roll and the delivering means.

3. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, means for causing the roll to rotate in a single direction in whichever direction the carriage moves back and forth over the surface and to a degree determined by the amount of movement of the carriage in either direction, the surface of the roll having traction-producing means for engaging sheet material bearing upon the roll, and means for guiding sheet material from the supply means to maintain the sheet material bearing upon the traction-producing means at all times as the sheet material moves from the supply means to the roll but to form a freely hanging loop of material between the roll and the sheet-material-delivering means.

4. A sheet material spreading machine for disposing sheet material in successive superimposed layers upon a surface, comprising a carriage moving back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, and means for causing the roll to rotate in a single direction in whichever direction the carriage moves back and forth over the surface and to a degree determined by the amount of movement of the carriage in either direction, the surface of the roll having traction-producing means for engaging sheet material bearing upon the roll, and means for guiding sheet material from the supply means to the delivering means, the guiding means comprising means to maintain the sheet material between the supply means and the roll substantially tangent to the roll at all times, the guiding means including a member positioned between the roll and the delivering means to dispose a portion of sheet material extending between the roll and the member so that, on failure of timing between the speed of delivery from the roll and the take up by the delivery means, the sheet material will rest slackly upon the roll, said member being adjustable to determine the degree of slack of the sheet material tangent to the roll.

5. A sheet material spreading machine for disposing sheet material in successive superimposed layers upon a surface, comprising a carriage movable back and forth upon the surface, sheet material supply means upon the carriage, means upon the carriage for delivering the sheet material to lay it down in layers upon the surface, means for drawing the sheet material from the supply means and for feeding it to the sheet-material-delivering means, the drawing-and feeding means comprising a single roll, and means for causing the roll to rotate in a single direction in whichever direction the carriage moves back and forth over the surface and to a degree determined by the amount of movement of the carriage in either direction, and means for guiding sheet material from the supply means to the delivering means, the guiding means comprising means to maintain the sheet material between the supply means and the roll substantially tangent to the roll at all times, the guiding means including a member positioned between the roll and the delivering means to provide a portion of material extending between the roll and the member so that, on failure of timing between the speed of delivery from the roll and the take up by the delivery means, the sheet material will rest slackly upon the roll, said member being adjustable to determine the degree of slack of the sheet material tangent to the roll.

6. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, and means for causing the roll to rotate in a single direction in whichever direction the carriage moves back and forth over the surface and to a degree determined by the amount of movement of the carriage in either direction, and means for guiding sheet material from the supply means to the roll, the guiding means including a member positioned to provide a portion of material extending between the roll and the member, said member being adjustable to determine the normal position at which the engaged sheet material is tangent to the roll.

7. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, means for causing the roll to rotate in a single direction in whichever direction the carriage moves back and forth over the surface and to a degree determined by the amount of movement of the carriage in either direction, the surface of the roll having traction-producing means for engaging sheet material bearing upon the roll, and an idler roller positioned below the roll to cause the material to encircle the roll at all times for a substantial part of its circumference, and then to guide the material toward the sheet-material-delivering means.

8. A sheet material spreading machine for disposing sheet material in successive superimposed layers upon a surface, comprising a carriage movable back and forth over the surface, sheet material supply means upon the carriage, means upon the carriage for delivering the sheet material to lay it down in layers upon the surface, and means for drawing the sheet material from the supply means and for feeding it to the sheet-material-delivering means, the drawing-and-feeding means comprising a single roll, means for causing the roll to rotate continuously in a single direction in whichever direction the carriage moves back and forth over the surface and to a degree determined by the amount of movement of the carriage in either direction, the surface of the roll having traction-producing means for engaging sheet material bearing upon the roll, an idler roller positioned below the roll to cause the material to encircle the roll at all times for a substantial part of its circumference and then to guide the material toward the sheet-material-delivering means, and means for supporting the idler roller for adjusting its position with relation to the roll to vary the effective engagement of the material around the roll.

9. A sheet material spreading machine for disposing sheet material in successive superimposed layers upon a surface comprising a carriage movable back and forth over the surface, sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, means for causing the roll to rotate continuously in a single direction in whichever direction the carriage moves back and forth over the surface and to a degree determined by the amount of movement of the carriage in either direction, the surface of the roll having traction-producing means for engaging sheet material bearing upon the roll, an idler roller, and means for supporting the idler roller to maintain it spaced a distance from the roll to cause a stretch of material to extend between the points of tangency on roll and roller and yet to cause the material to encircle the roll at all times for a substantial part of its circumference, the idler roller providing means for guiding the material toward the sheet-material-delivering means.

10. A sheet material spreading machine for disposing sheet material in successive superimposed layers upon a surface, comprising a carriage movable back and forth over the surface, a sheet material supply means upon the carriage, means upon the carriage for delivering the sheet material to lay it down in layers upon the surface, means for drawing the sheet material from the supply means and for feeding it to the sheet-material-delivering means, the drawing-and-feeding means comprising a single roll, and single means for causing the roll to rotate and to drive the sheet-material-delivering means continuously in one direction as the carriage moves back and forth over the surface.

11. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, single means for causing the delivering means to function continuously to spread fabric upon the surface in whichever direction the carriage is moving as it moves back and forth over the surface, the delivering means including devices for guiding the sheet material into close proximity to the surface or the layers already deposited thereon, and means for positively energizing the devices as the carriage enters a predetermined portion of its travel upon the surface positively to feed the sheet material and deposit it in layer-forming position upon the surface.

12. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, the delivering means including a pair of positive feeding members, means for causing the members to move substantially continuously in the direction to deliver sheet material to the surface in whichever direction the carriage is moving as it moves back and forth over the surface, and means for making the members effective positively to feed sheet material and deposit it in layer-forming position upon the surface during the time the carriage is moving but only in a predetermined portion less than the total distance of its travel over the surface in a predetermined direction.

13. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, the delivering means including a pair of positive feeding members, means for causing the members to move substantially continuously in the direction to deliver sheet material to the surface in whichever direction the carriage is moving as it moves back and forth over the surface, and means for causing the members to move positively toward each other when the carriage reaches a position intermediate the extent of its travel over the surface and thereafter positively to engage the sheet material between them and deposit it in layer-forming position upon the surface during the remainder of the movement of the carriage in that direction over the surface.

14. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, the delivering means including a pair of rollers, means for providing continuous motive power for rotating the rollers in the direction to deliver the sheet material to the surface in whichever direction the carriage is moving as it moves back and forth on the surface, and means for causing the rollers to move positively toward each other when the carriage reaches a position intermediate the extent of its travel over the surface and thereafter positively to engage the sheet material between them and positively to feed the sheet material and deposit it in layer-forming position upon the surface during the remainder of the movement of the carriage in that direction over the surface.

15. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, the delivering means including a pair of rollers, means for providing continuous motive power for rotating the rollers in the direction to deliver the sheet material to the surface in whichever direction the carriage is moving as it moves back and forth over the surface, and means for causing the rollers to rotate and to move the rollers positively toward each other when the carriage reaches a position intermediate the extent of its travel over the surface and thereafter positively to engage the sheet material between them and positively to feed the sheet material and deposit it in layer-forming position upon the surface during the remainder of the movement of the carriage in that direction over the surface.

16. A sheet material spreading machine for disposing sheet material in successive superimposed layers upon a surface, comprising a carriage movable back and forth over the surface, sheet material supply means upon the carriage, means upon the carriage for delivering the sheet material from the supply means to lay it down in layers upon the surface, the delivering means including a pair of rollers, means for providing continuous motive power for rotating the rollers in the direction to deliver the sheet material to the surface in whichever direction the carriage is moving as it moves back and forth on the surface, and means for causing the rollers to rotate and thereupon causing the rollers positively to move toward each other when the carriage reaches a position intermediate the extent of its travel over the surface and thereafter positively to engage the sheet material between them and positively to feed the sheet material and deposit it in layer-forming position upon the surface during the remainder of the movement of the carriage in that direction over the surface.

17. A sheet material spreading apparatus wherein a carriage moves over a surface and means on the carriage spreads a continuous layer of the sheet material back and forth upon the surface, the spreading means constituting means for feeding the sheet material down to an end position and at that position turning back to form an end fold, means on the surface for cooperating with the carriage to retain the sheet material deposited upon the surface against disturbance of said end-folds, the retaining means having a vertically movable member, means for guiding the member in a substantially rectilinear path, the member having means for assuming a position upon the end-fold to hold the end-fold against distortion from that relationship, the feeding means constituting means to form and position an end-fold upon the end-fold holding means while the end-fold holding means remains in end-fold holding position, and means for moving the end-fold holding means out of that holding position from beneath the fold just formed on top of the holding means as the carriage moves away from end-fold forming position and then for returning the end-fold holding means to come to rest upon the newly formed fold for holding all of the formed folds in position.

18. A sheet material spreading apparatus wherein a carriage moves over a surface and means on the carriage spreads a continuous layer of sheet material back and forth upon the surface, the spreading means constituting means for positively feeding the sheet material down to an end position and at that position turning back to form an end-fold while still continuing positively to feed the sheet material, means on the surface for cooperating with the carriage to retain the sheet material deposited upon the surface against disturbance of said end-folds, the retaining means having a vertically moving member, means for guiding the member in a substantially rectilinear path, the member having means for assuming a position upon the end-fold and then for holding the end-fold in that relationship, the feeding means constituting means to form and position an end-fold while the end-fold holding means remains in end-fold holding position, and means for moving the end-fold holding means out of the holding position as the carriage moves away from end-fold forming position but while the spreading means still continues to feed the sheet material positively, said moving means guiding the end-fold holding means into end-fold holding position.

19. A sheet material spreading apparatus wherein a carriage moves over a surface and means on the carriage spreads a continuous layer of sheet material back and forth upon the surface and to produce end folds therein, means on the surface for cooperating with the carriage to retain the sheet material deposited on the surface against disturbance of said end-folds, the retaining means having a vertically moving member, means for guiding the member in a substantially rectilinear path, means pivotally mounted on the member for assuming a position on the end-fold and for holding the end-fold against distortion from its formed relationship, the spreading means constituting means to form and position the end-fold while the end-fold holding means remains in end-fold holding position, and means for lifting the member to cause the pivotally mounted means to move out of the holding position as the carriage moves away from end-fold forming position, the lifting means thereafter serving to guide the pivotally mounted means back into end-fold holding position.

20. A sheet material spreading apparatus wherein a carriage moves over a surface and means on the carriage spreads a continuous layer of the sheet material back and forth upon the surface, the spreading means constituting means for feeding the sheet material down to an end position and at that position turning back to form an end-fold, means on the surface for cooperating with the carriage to retain the sheet material deposited upon the surface against disturbance of said end-folds, the retaining means including a movable member, the member including means for assuming a position upon the end-fold and then holding the end-fold in that relationship, the feeding means constituting means to form and position an end-fold while the end-fold holding means remains in end-fold holding position, and means for moving the end-fold holding means out of the holding position as the carriage moves away from end-fold forming position and then for returning the end-fold holding means to holding position while the spreading means still effectively positions the fabric in layer-forming position.

21. A sheet material spreading apparatus wherein a carriage moves over a surface and means on the carriage spreads a continuous layer of the sheet material back and forth upon the surface, the spreading means comprising means for positively feeding the sheet material as the carriage approaches a limit of travel of the carriage over the surface so that, as the carriage turns back, at the limit, the fed material will form an end-fold, and means on the surface for retaining the formed end-folds, the means comprising a pair of transverse members at least one of which remains constantly bearing upon the formed end-folds, and means for engaging the end-fold retaining means for changing its position while one of the members continues in engagement with previously formed end-folds to bring the other member into engagement with an end-fold just immediately formed.

References Cited in the file of this patent

UNITED STATES PATENTS

| | | |
|---|---|---|
| 216,032 | Frost | June 3, 1879 |
| 1,308,354 | Heywood | July 1, 1919 |
| 1,571,808 | Schwartzman | Feb. 2, 1926 |
| 2,124,267 | Waibler | July 19, 1938 |
| 2,175,823 | Breth | Oct. 10, 1939 |
| 2,189,059 | Dearsley | Feb. 6, 1940 |
| 2,263,555 | Gilbert et al. | Nov. 25, 1941 |
| 2,478,840 | Sayles | Aug. 9, 1949 |
| 2,615,712 | Springer | Oct. 28, 1952 |
| 2,756,992 | Rosenthal | July 31, 1956 |